(12) United States Patent
Gandhi et al.

(10) Patent No.: US 11,187,659 B2
(45) Date of Patent: *Nov. 30, 2021

(54) SYSTEMS FOR FLUORESCENCE LIGHT SHEET MICROSCOPY OF LARGE SAMPLES IN HIGH REFRACTIVE INDEX SOLUTIONS

(71) Applicants: THE REGENTS OF THE UNIVERSITY OF CALIFORNIA, Oakland, CA (US); Translucence Biosystems, Inc., Irvine, CA (US)

(72) Inventors: Sunil Gandhi, Irvine, CA (US); Ricardo R. Azevedo, Irvine, CA (US); Damian Wheeler, Irvine, CA (US)

(73) Assignees: THE REGENTS OF THE UNIVERSITY OF CALIFORNIA, Oakland, CA (US); TRANSLUCENCE BIOSYSTEMS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,659

(22) Filed: Jun. 9, 2020

(65) Prior Publication Data
US 2020/0309700 A1    Oct. 1, 2020

Related U.S. Application Data

(63) Continuation-in-part of application No. 16/832,532, filed on Mar. 27, 2020, now abandoned.
(Continued)

(51) Int. Cl.
| | | |
|---|---|---|
| *G01N 21/64* | (2006.01) | |
| *G02B 21/16* | (2006.01) | |

(Continued)

(52) U.S. Cl.
CPC ..... *G01N 21/6458* (2013.01); *G01N 21/6486* (2013.01); *G02B 21/06* (2013.01);
(Continued)

(58) Field of Classification Search
CPC .......... G01N 21/6458; G01N 21/6486; G01N 2201/061; G01N 2021/6463; G01N 2021/6482; G02B 21/16; G02B 21/06; G02B 21/26; G02B 21/33; G02B 21/34; G02B 21/367
See application file for complete search history.

(56) References Cited

U.S. PATENT DOCUMENTS

| | | | |
|---|---|---|---|
| 2012/0206798 A1* | 8/2012 | Knop .................. | G02B 21/002 359/385 |
| 2015/0029325 A1* | 1/2015 | Dholakia ........... | G02B 27/0988 348/79 |

(Continued)

*Primary Examiner* — Kiho Kim
(74) *Attorney, Agent, or Firm* — Nguyen Tarbet LLC (57) ABSTRACT

Systems for allowing adjustable imaging of specimens of various sizes in solutions of various refractive indices, such as those with a refractive index of at least 1.45, for use in microscopes such as fluorescent light sheet microscopes. The systems allow for imaging large specimens in various refractive indices while maintaining the highest optical sectioning provided by the objectives used across the full range of microscope stage travel. The systems also allow the use of a wider range of optics, such as low magnification 2.5× detection objectives, allowing for increased imaging speed and field of view.

20 Claims, 11 Drawing Sheets

Related U.S. Application Data

(60) Provisional application No. 62/825,232, filed on Mar. 28, 2019.

(51) Int. Cl.
  *G02B 21/06* (2006.01)
  *G02B 21/26* (2006.01)
  *G02B 21/33* (2006.01)

(52) U.S. Cl.
  CPC ............ *G02B 21/16* (2013.01); *G02B 21/26* (2013.01); *G02B 21/33* (2013.01); *G01N 2021/6463* (2013.01); *G01N 2201/061* (2013.01)

(56) References Cited

U.S. PATENT DOCUMENTS

| | | | |
|---|---|---|---|
| 2015/0098126 A1* | 4/2015 | Keller | G02B 21/0076 359/385 |
| 2019/0265454 A1* | 8/2019 | Kalkbrenner | G02B 21/0032 |

\* cited by examiner

SYSTEMS FOR FLUORESCENCE LIGHT SHEET MICROSCOPY OF LARGE SAMPLES IN HIGH REFRACTIVE INDEX SOLUTIONS

CROSS-REFERENCES TO RELATED APPLICATIONS

This application is a continuation-in-part and claims benefit of U.S. Non-Provisional application Ser. No. 16/832,532 filed Mar. 27, 2020, which claims benefit of U.S. Provisional Application No. 62/825,232 filed Mar. 28, 2019, the specifications of which is/are incorporated herein in their entirety by reference.

STATEMENT REGARDING FEDERALLY SPONSORED RESEARCH OR DEVELOPMENT

A portion of this invention was made with government support under Grant No. DP2EY024504-01 awarded by NIH. The government may have certain rights in the invention.

FIELD OF THE INVENTION

The present invention is directed to light sheet fluorescence microscopy for the imaging of biological samples. Specifically, the present invention is directed to light sheet fluorescence microscopy for the imaging of biological samples in solutions of various refractive indices.

BACKGROUND OF THE INVENTION

Light sheet fluorescence microscopy is a growing practice in the field of optical imaging of tissue samples and is defined by the concept of completely separating the detection pathway of a microscope from the sample illuminating pathway of the microscope. A light sheet fluorescence microscope illuminates a thin layer of a sample, such that the focal plane of a detection objective is overlapping or coincident to the thin layer of excitation light. This technique is designed for efficient optical sectioning and provides for fast imaging speed. However, such light sheet fluorescence microscopes may struggle with efficiently imaging samples in high refractive index (RI) substance, such as those used in tissue clearing applications for intact tissue imaging.

Existing chambers for the ZEISS Z.1 fluorescence light sheet microscope are designed for imaging of biological samples in aqueous solutions of RI<=1.45. Using these chambers with high RI organic solutions that render biological samples optically clear results in mispositioned excitation light sheets and emission objective focal planes that limit the optical resolution and effective imaging area on the ZEISS Z.1 fluorescence light sheet microscope. Therefore, given the proliferation of chemical clearing techniques, a present need exists for a light sheet fluorescence microscopy system that utilizes the optical performance of the Z.1 fluorescence light sheet microscope, yet is capable of efficiently imaging biological samples in multiple, distinct high RI solutions.

Furthermore, existing specimen imaging systems are calibrated for imaging biological samples in one refractive index at a time. Adjusting a specimen imaging system to a new refractive index requires the addition or replacement of lenses in the objectives or optically adjusting both the detection and excitation objectives to adjust the focal plane optics and produce clear images upon excitation. Therefore, a present need exists for a light sheet fluorescence microscopy system capable of efficiently imaging biological samples in various RI solutions.

BRIEF SUMMARY OF THE INVENTION

It is an objective of the present invention to provide systems that allow for light sheet fluorescence microscopy of biological samples in various RI solutions, as specified in the independent claims. Embodiments of the invention are given in the dependent claims. Embodiments of the present invention can be freely combined with each other if they are not mutually exclusive.

The present invention features a specimen imaging system for use in a fluorescence light sheet microscope for producing an image of a specimen in a various refractive index solutions (e.g., a solution having a refractive index (RI) of 1.45 to 1.6). In some embodiments, the system comprises a specimen chamber for accommodating a tissue; a first and a second side window for a light sheet generated by an illumination objective, spaced to center a beam waist at a detection focal plane; a chamber positioning mechanism for facilitating adjustment of an detection objective focal plane according to the refractive index of the solution to increase imaging range and match the focal plane of the light sheet; a specimen holder for suspending large tissue specimens within the chamber; and a detection objective collar for preventing accidental collision with the specimen chamber during positioning.

In some embodiments, a volume of the tissue is approximately 1 $cm^3$. In some embodiments, the tissue is 1 $cm^3$ or more. In some embodiments, the tissue is from 0.5 $cm^3$ to 2 $cm^3$.

In some embodiments, the fluorescence light sheet microscope is a Zeiss Z.1 Fluorescence Light Sheet Microscope or Lightsheet 7 Microscope.

While prior fluorescence light sheet microscopy systems are limited in the size of the specimen being imaged, the present invention makes use of a larger specimen chamber size and low magnification objectives to allow imaging of overall larger specimens. Prior fluorescence light sheet microscopy systems additionally struggle with imaging specimens in solutions with a high refractive index.

Figure 9:
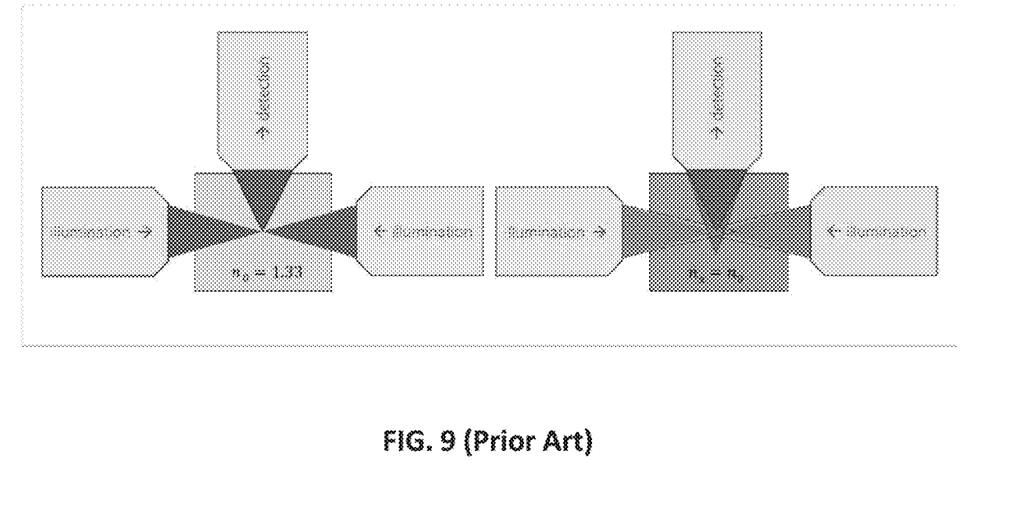
FIG. 9 shows a diagram from prior art of a focus shift of a detective objective as a result of a change from a solution with a first refractive index to a solution with a second refractive index.
Figure 10:
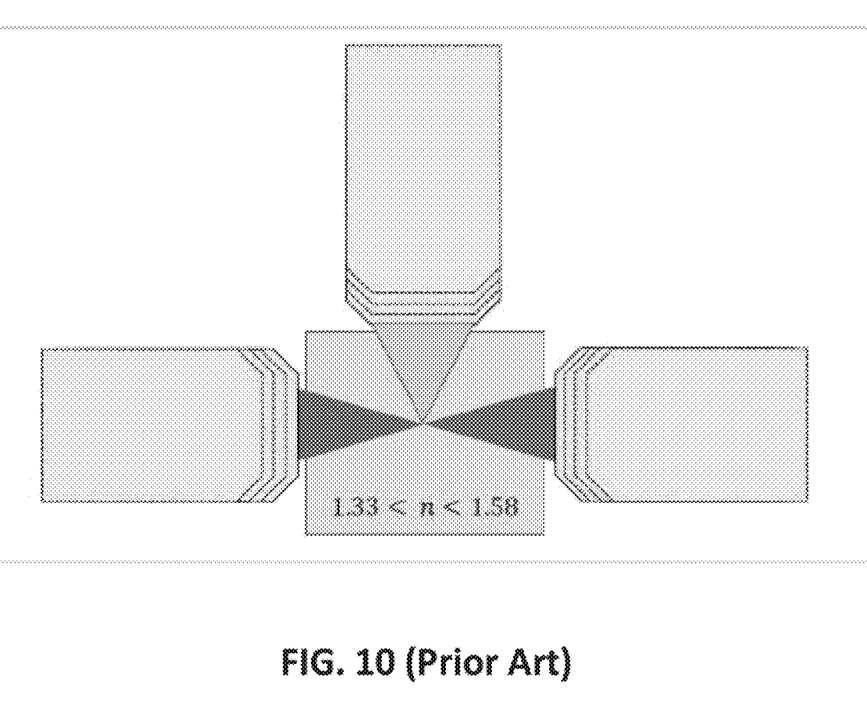
FIG. 10 shows a diagram from prior art of adjusting for a change in solution and refractive index by altering a focus of the illumination objectives.

One of the unique and inventive technical features of the present invention is the use of a chamber positioning mechanism for adjusting the distance between a specimen chamber and a detection objective to focus a detection objective focal plane. Without wishing to limit the invention to any theory or mechanism, it is believed that the technical feature of the present invention advantageously provides for producing clear images of biological samples in a plurality of different refractive index solutions. None of the presently known prior references or work has the unique inventive technical feature of the present invention. Furthermore, the feature of the present invention is counterintuitive. The reason that it is counterintuitive is because the prior references teach away from the present invention. For example, prior systems teach that adjusting a fluorescence light sheet microscopy system to a new refractive index requires replacement or focusing adjustment of lenses in both the detection and illumination objective to adjust the sharpness and position of the focal plane. Therefore, the prior references teach away from the present invention and the present invention is counterintuitive. The features of the present invention are counterintuitive because the inventive technical features of the present invention contributed to a surprising result. One skilled in the art would expect that adjusting the specimen imaging system to a new refractive index would require additional adjustments to the illumination objectives generating the light sheet to produce a clear image in high RI solutions. Therefore, the present invention is counterintuitive because it only adjusts the detection objective focal plane and the distance between the sample chamber and the detection objective. Surprisingly, changes within a high range of refractive indices do not greatly affect image clarity at typical light sheet fluorescence microscope resolutions and adjustments to the detection objective focal plane are capable of providing a clear image of a biological specimen without the need for adjustments to the light sheet position by either adjusting the position of the side windows or adjusting the optics of the excitation objective. Furthermore, prior systems (e.g. the Zeiss Lightsheet 7 Microscope) outright teach the coordinated adjustment of the illumination objectives to produce a clear image in high RI solutions. FIG. 9 shows a diagram from a technical note from the Zeiss Lightsheet 7 Microscope prior art that shows a focus shift of a detective objective as a result of a change from a solution with a first refractive index to a solution with a second refractive index. FIG. 10 shows a diagram from a technical note from the Zeiss Lightsheet 7 Microscope prior art that outlines the prior method of adjusting the illumination objectives to adjust to a new refractive index. Therefore, the prior references teach away from the present invention and the present invention is counterintuitive.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

DETAILED DESCRIPTION OF THE INVENTION

Following is a list of elements corresponding to a particular element referred to herein:
1 specimen chamber
2 side windows
3 window seal
4 chamber positioning screw
5 specimen holder
6 detection objective
7 detection objective collar
10 illumination objective
20 beam waist
25 detection optic focal plane
100 specimen imaging system
200 biological specimen/tissue The present invention features a specimen imaging system. The system of the present invention may be capable of adjusting a detection objective focal plane (25) according to a refractive index of a high RI solution to produce a clear image of a biological specimen (200). The system of the present invention may increase imaging speed for large samples by facilitating the use of low magnification detection objectives (e.g., 2.5×); improve optical sectioning in various refractive index solutions; increase the chamber volume and modify detection path focal length, thereby increasing the size of specimens that can be imaged; and provide a new specimen mounting mechanism to accommodate larger samples.

The aforementioned features are accomplished through a combination of repositioned light sheet path windows, adjusted path length to the imaging objective, improved integrity of window seals to prevent leaks, optimized overlap between light sheet and imaging objective focal planes through hardware and software adjustments, and new specimen mounting hardware.

The systems of the present invention may be used with appropriate microscopes such as the Zeiss Z.1 Light Sheet Microscope or Lightsheet 7 microscope.

Figure 1:
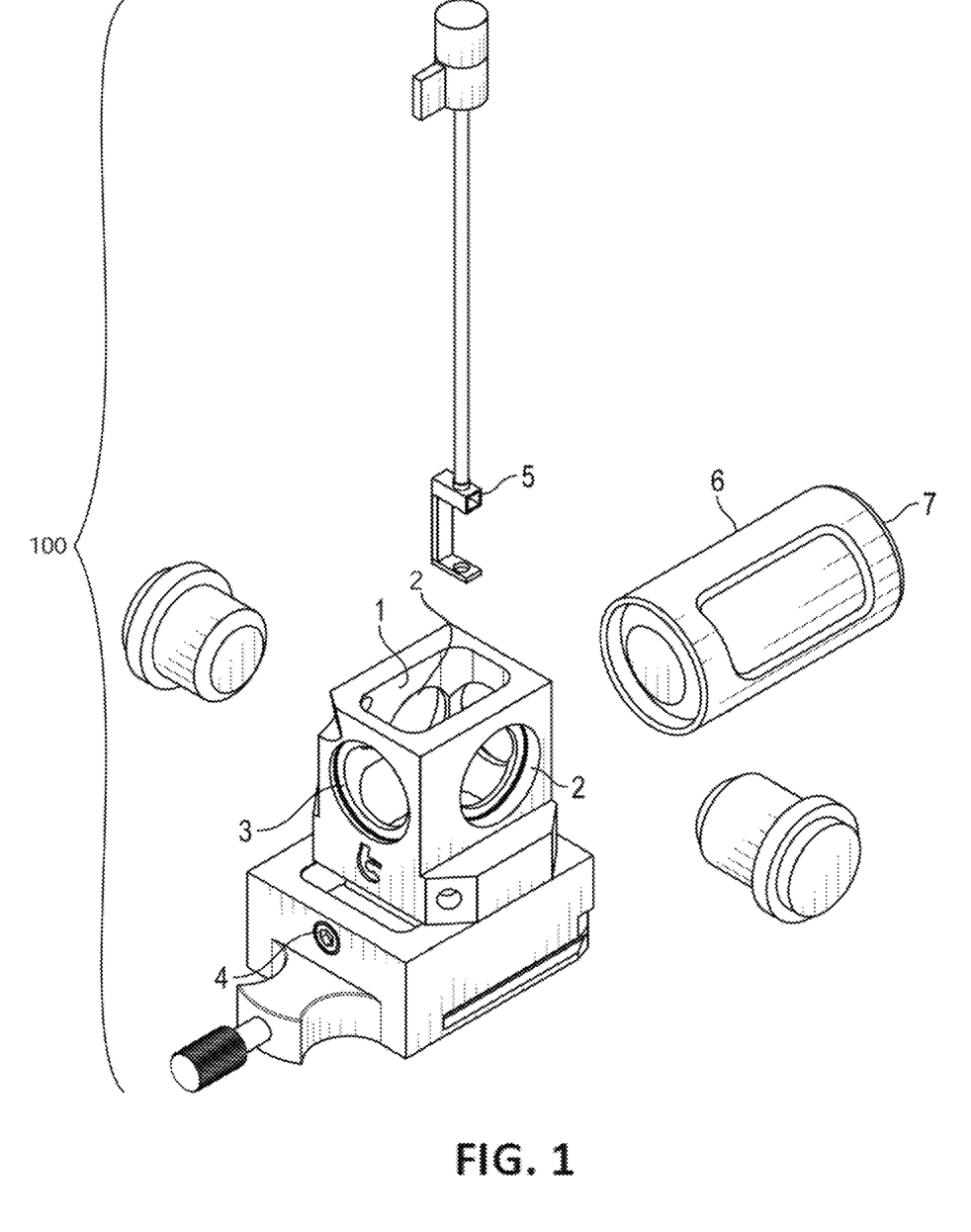
FIG. 1 shows a detailed view of components of the system of the present invention.
Figures 2A, 2B, 2C, 2D:
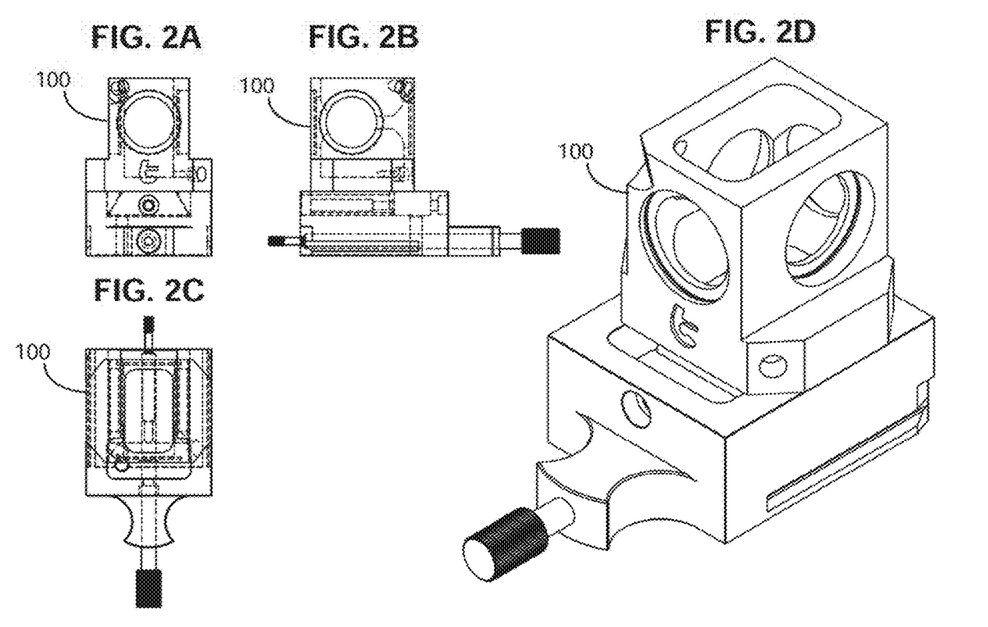
FIG. 2A shows a front view of the system of the present invention.
FIG. 2B shows a side view of the system of the present invention.
FIG. 2C shows a top view of the system of the present invention.
FIG. 2D shows an isometric view of the system of the present invention.

Referring to FIG. 1 and FIG. 2, a specimen chamber (1) accommodates full stage travel of large tissue ~2 cm$^3$ (e.g., for whole rat brains). A first and a second side window (2) for the light sheets are positioned on either side of the specimen chamber (1) and are spaced to center a beam waist (20) of a light sheet focal plane at a detection optic focal plane (25). The detection optic focal plane (25) may be a viewable range of a microscope. The light sheet focal plane may be a plane of illumination of the microscope. Centering the beam waist (20) at the detection optic focal plane (25) allows microscope viewability at a point of light sheet focus. A window seal (3) design (including gaskets) may be made of immersion-solvent resistant materials to prevent leaks and positioned around the first side window and the second side window (2). A chamber positioning screw (4) operatively connected to the specimen chamber (1) may facilitate adjustment of the imaging objective focal plane according to the refractive index of the high RI solution. A specimen holder (5) may be removably disposed above the specimen chamber (1) and may be designed to suspend large tissue specimens ~2 cm³ in the specimen chamber (1). A detection objective collar (6) prevents accidental collision with the specimen chamber during positioning. The detection objective collar (6) repositions the objective's focal plane to increase imaging range and match the refractive index of the solution.

The present invention features systems for enabling the use of the Zeiss Z.1 fluorescence light sheet microscope, Lightsheet 7 microscope, or any other applicable microscope for imaging specimens in various refractive index solutions (e.g. a refractive index (RI) of 1.45-1.6). Tissue clearing strategies make it possible to image deep into complex tissues, such as whole mouse brains, by rendering the tissue optically transparent. The systems of the present invention allow for a flat, thin beam of light to illuminate large biological tissues previously unachievable by the existing Zeiss system. The imaging chamber will increase the 1) speed, 2) spatial resolution and 3) specimen size for fluorescence light sheet imaging on the Z1 system for high refractive index cleared specimens (e.g., for solutions with a refractive index (RI) of at least 1.45).

The systems of the present invention feature larger chambers for fitting larger tissues such as whole mouse brains, a leak resistant window, an added positioner for centering the light sheet in the sample and focusing the detection objective focal plane (25), and an objective safety collar for preventing collision with the chamber. Optionally, sample holders may be featured.

In some embodiments, the systems of the present invention are used for obtaining high resolution, fast 3-D imaging of brain samples. However, the present invention is not limited to this particular application.

In some embodiments, the system increases imaging speed for large samples. In some embodiments, the system facilitates use of low magnification detection objectives for imaging large biological samples. In some embodiments, the system improves optical sectioning in high refractive index solutions. In some embodiments, the system has an increased chamber volume as compared to traditional chambers. In some embodiments, the system has an increased detection path focal length to increase the size of specimens that can be imaged.

Figure 3:
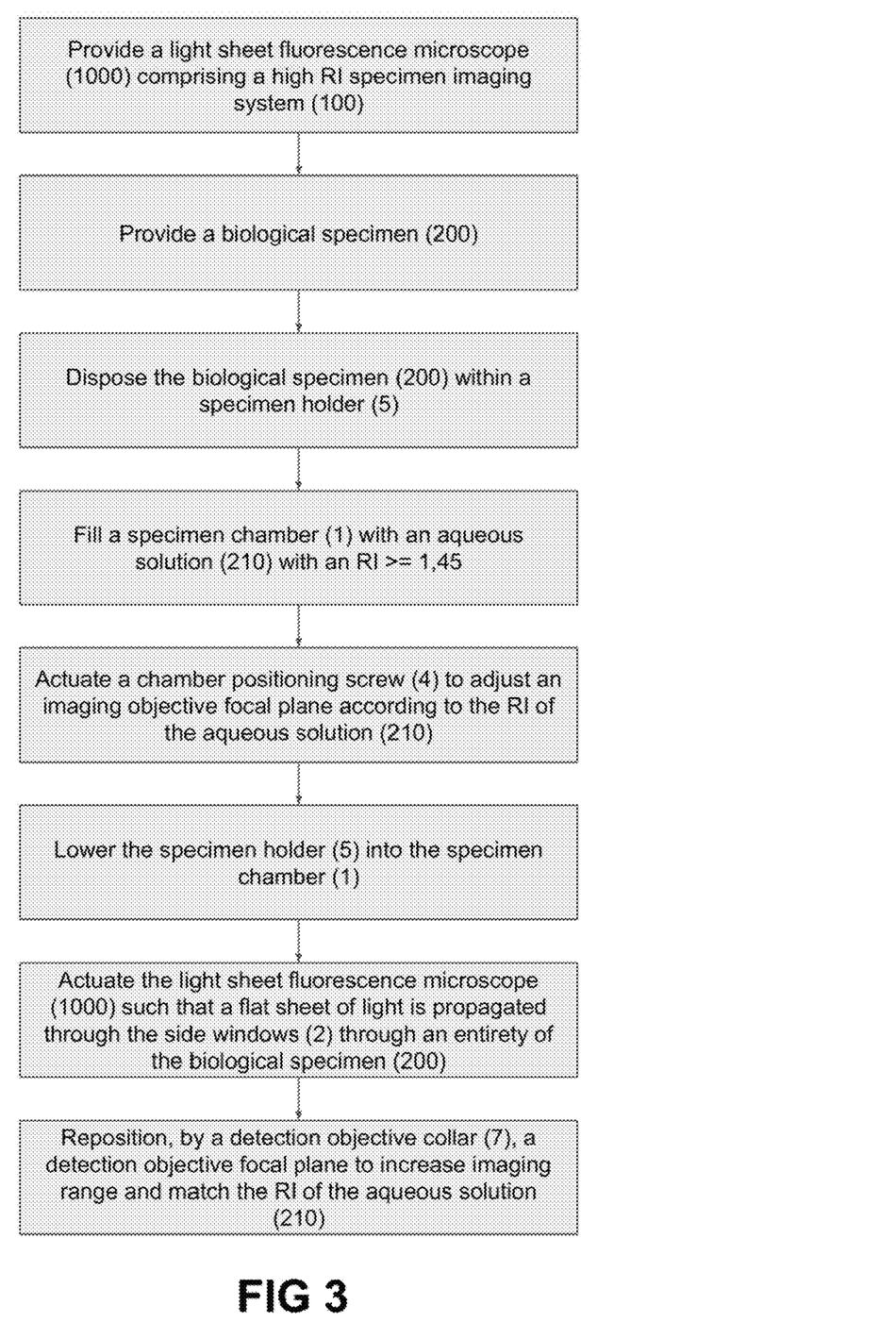
FIG. 3 shows a flow chart of a method of the present invention.
Figure 4:
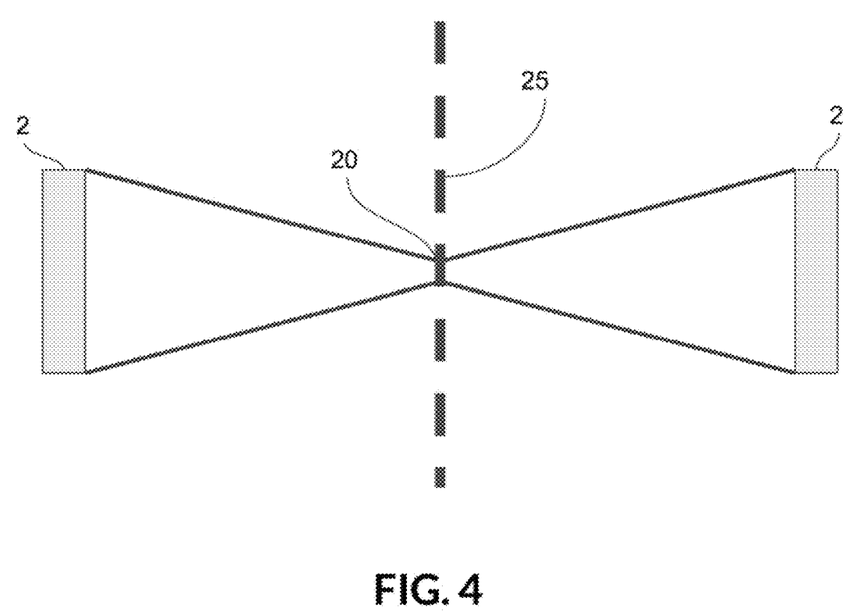
FIG. 4 shows a zoomed-in view of a beam waist aligned with a detection objective focal plane.
Figure 5A:
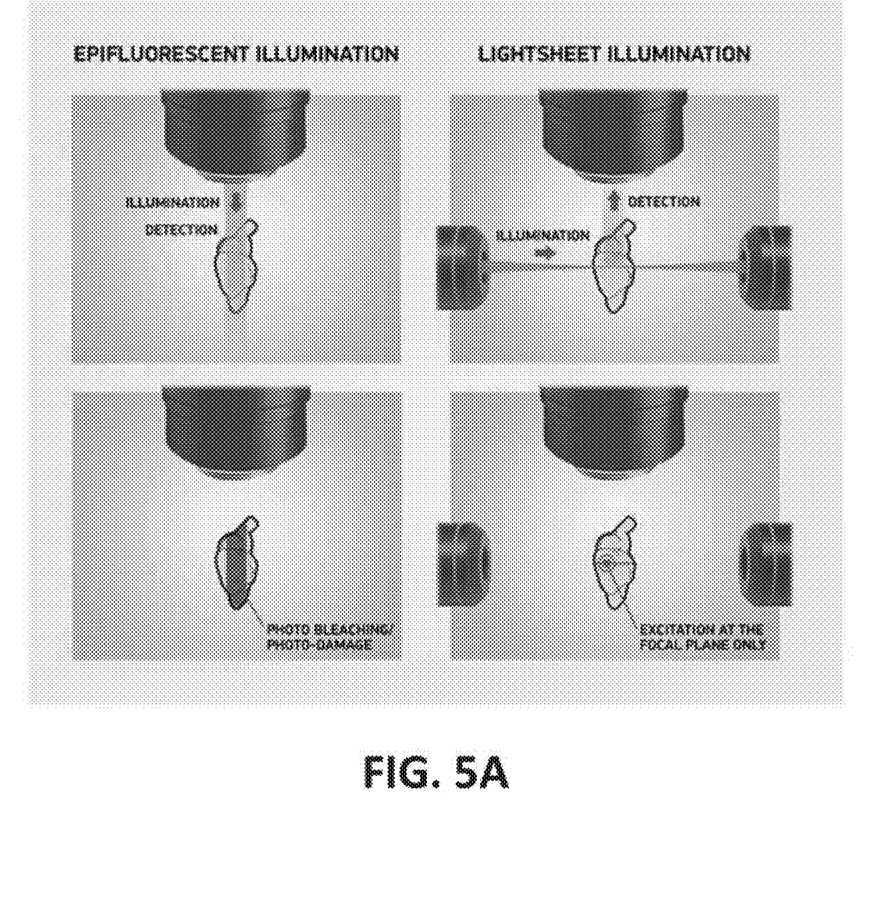
FIG. 5A shows a method of general epifluorescent illumination and general lightsheet
Figure 5B:
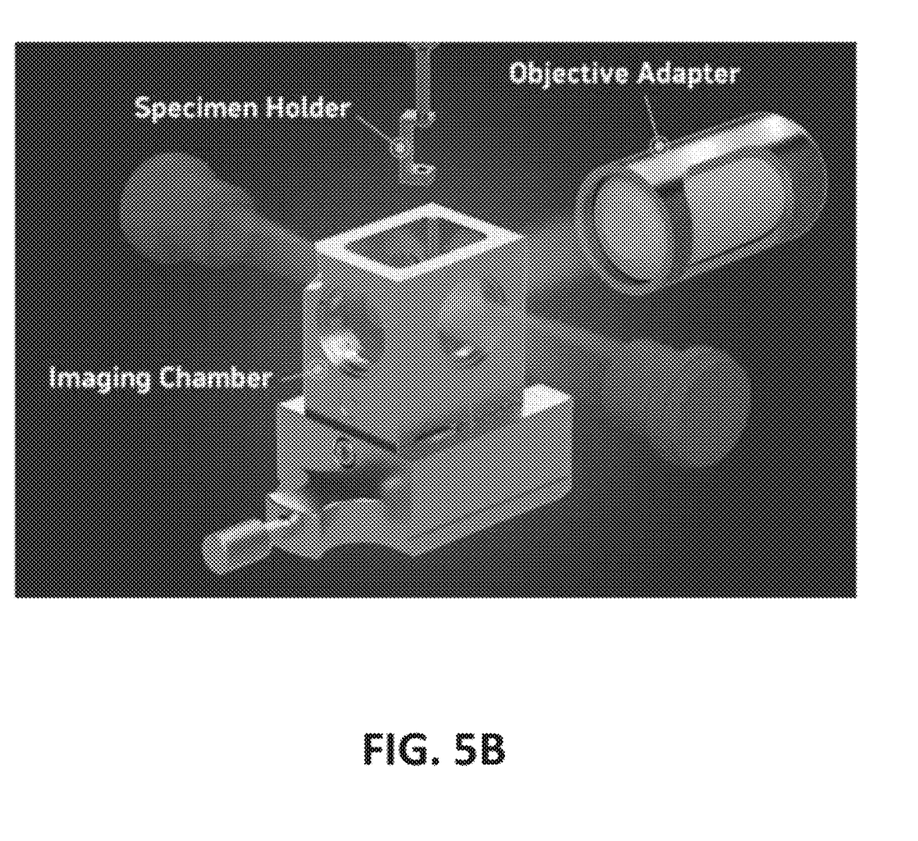
FIG. 5B shows a perspective ISO view of general light sheet fluorescence microscopy.
Figure 6:
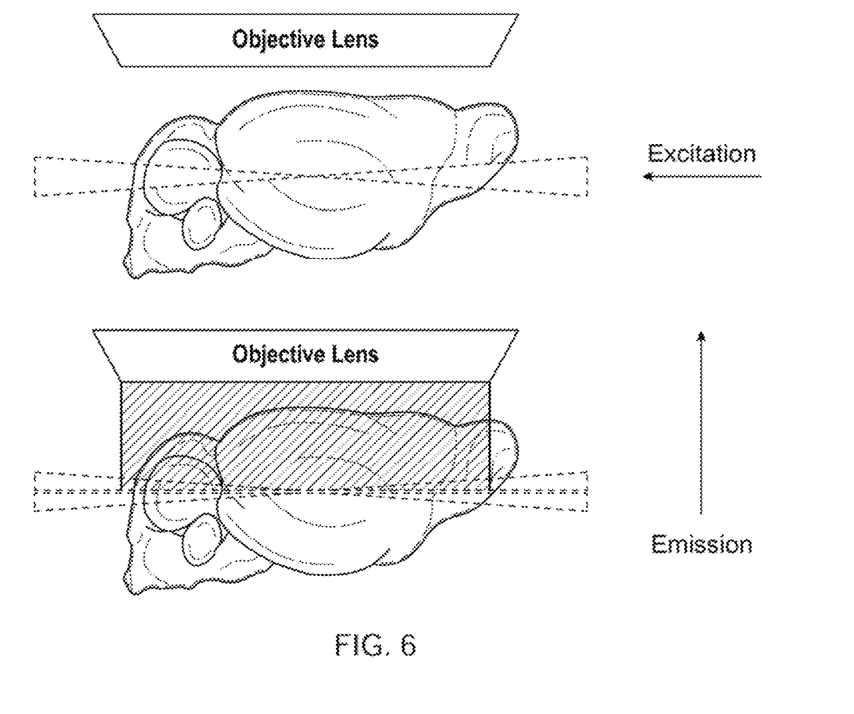
FIG. 6 shows a schematic of general light sheet fluorescence microscopy.
Figure 7:
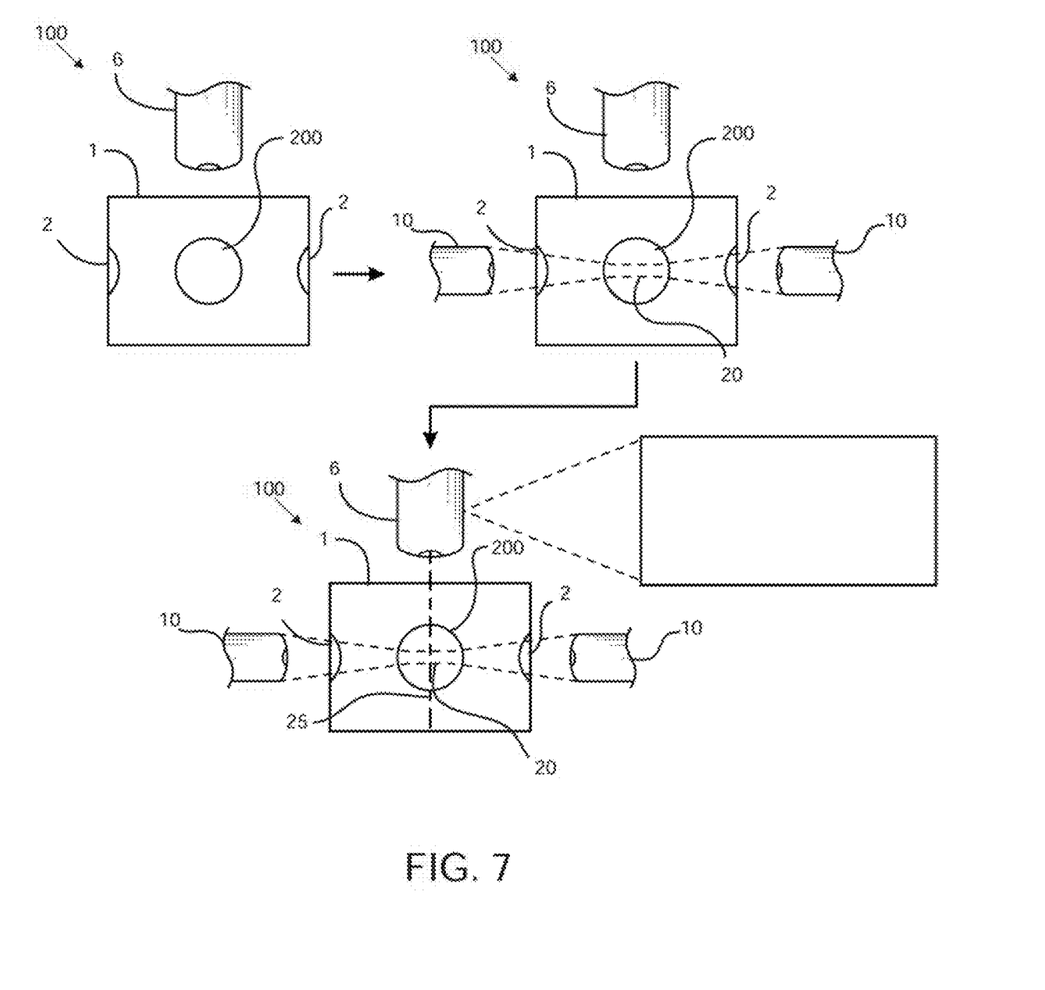
FIG. 7 shows a diagram of general light sheet fluorescence microscopy.
Figure 8:
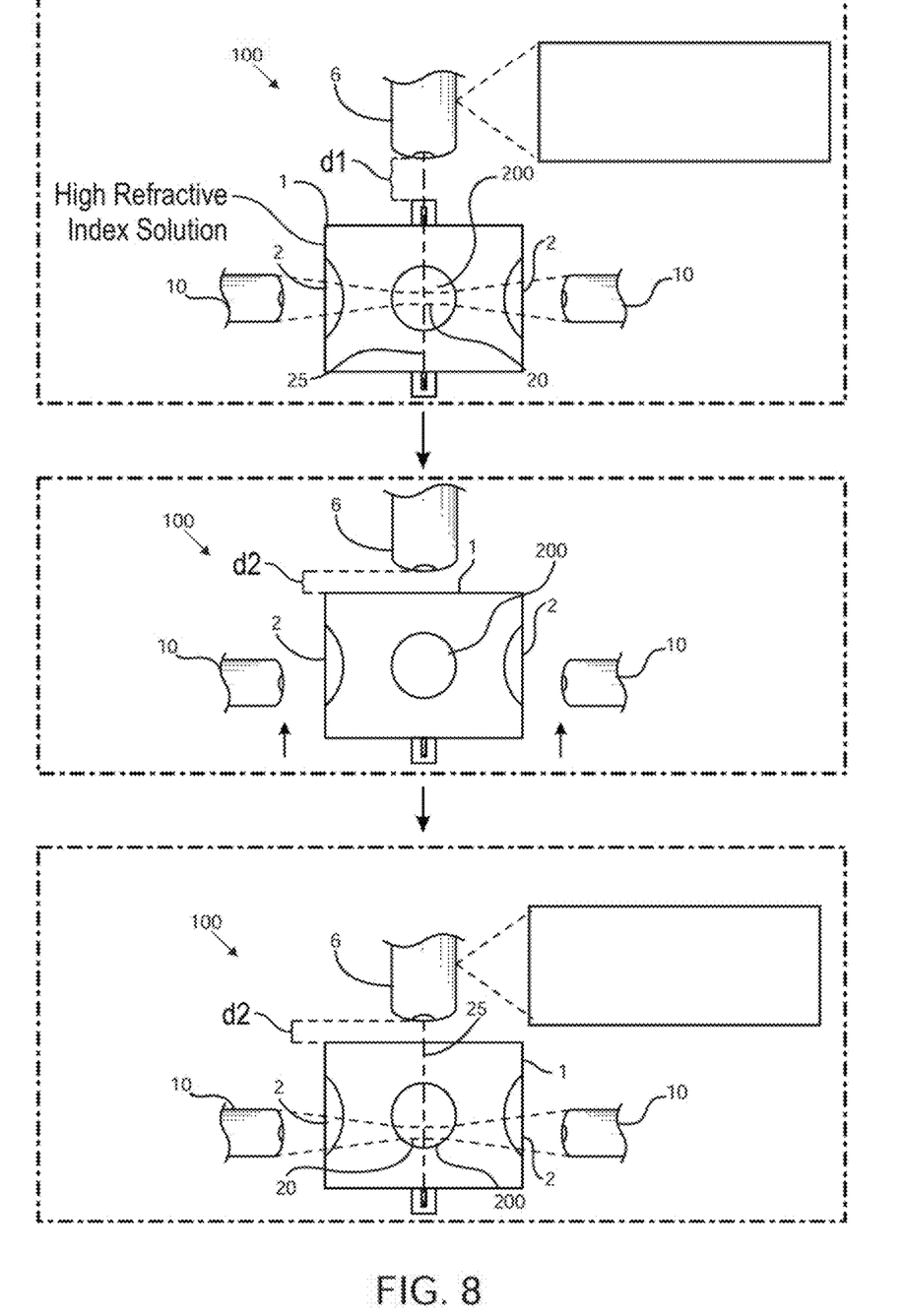
FIG. 8 shows a diagram of a method of the present invention for adjusting a detection objective focal plane to produce a clear light sheet fluorescence microscope image in a solution with a high refractive index.

Referring now to FIG. 3 and FIG. 8, the present invention features a method of light sheet fluorescence microscopy for imaging a biological specimen (200) in various refractive index solutions. In some embodiments, the method may comprise providing a light sheet fluorescence microscope with a specimen imaging system (100). A detection objective (6) of the specimen imaging system (100) may be a first distance (d1) away from a specimen chamber (1) of the specimen imaging system (100). The light sheet fluorescence microscope may be a Zeiss Z.1 Fluorescence Light Sheet Microscope or Lightsheet 7 Fluorescence Light Sheet Microscope. The method may further comprise providing a biological specimen (200) and disposing the biological specimen (200) within a specimen holder (5). In some embodiments, the biological specimen (200) is 1 cm³ or more in size. In some embodiments, the biological specimen (200) is between 0.5 cm³ to 2 cm³ in size. The method may further comprise filling the specimen chamber (1) with a solution or other high RI solution with a refractive index of 1.45-1.6. The method may further comprise actuating a chamber positioning screw (4) to adjust a detection objective focal plane (25) according to the refractive index of the solution. The specimen holder (5) may then be lowered into the specimen chamber (1). The light sheet fluorescence microscope may then be actuated such that a flat sheet of light is propagated through a first and a second side window (2) and through an entirety of the biological specimen (200). The side windows (2) may be capable of centering a beam waist of the light sheet at the detection objective focal plane (25). The method may further comprise adjusting the detection objective focal plane (25) further to produce a clear image of the biological specimen (200) in the solution. The detection objective (6) may produce a clear image of the biological specimen (200) at a second distance (d2) from the specimen chamber (1). In some embodiments, the method may further comprise using a detection objective collar (7) for preventing collisions between a detection objective (6) and the specimen chamber (1). In some embodiments, the light sheet fluorescence microscope may facilitate use of low magnification detection objectives and improve optical sectioning in high refractive index solutions. The chamber volume of the specimen imaging system (100) may be an increased chamber volume as compared to traditional chambers. The specimen imaging system (100) may have an increased detection path focal length to increase the size of specimens that can be imaged. The method of the specimen imaging system (100) may allow for an adjustment to a path length of the detection objective to compensate for a bend in the light path caused by the high refractive index solution.

It is of note that the method featured in the present invention of adjusting a distance between a detection objective and a sample chamber to compensate for changes in a refractive index may be applicable to a number of other forms of microscopy, such as confocal microscopy.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A specimen imaging system (100) for use in a fluorescence light sheet microscope to adjust a detection objective focal plane (25) for focused imaging of a tissue (200) in a plurality of different solutions:
   (a) a specimen chamber (1) for accommodating the tissue (200);
   (b) a first and second side window (2) positioned on either side of the specimen chamber (1), wherein the side windows (2) are spaced to center a beam waist of a light sheet generated by an illumination objective (10) at a focal plane of a detection objective (6); and
   (c) a chamber positioning mechanism (4) operatively connected to the specimen chamber (1) for facilitating adjustment of a position of the specimen chamber (1), wherein adjusting the position of the specimen chamber (1) adjusts the detection objective focal plane (25).

2. The system of claim 1, wherein the specimen imaging system (100) is capable of producing clear images in solutions with a refractive index (RI) of 1.45-1.6.

3. The system of claim 1 further comprising a detection objective collar (7) disposed on an end of the detection objective (6) wherein the detection objective collar (7) prevents the detection objective (6) from contacting the specimen chamber (1).

4. The system of claim 1 further comprising a specimen holder (5) for suspending the tissue (200) within the chamber (1).

5. The system of claim 1, wherein the fluorescence light sheet microscope is a Zeiss Z.1 Fluorescence Light Sheet Microscope.

6. The system of claim 1, wherein the system (100) increases imaging speed for large samples.

7. The system of claim 6, wherein the system (100) increases imaging speed for large samples through the use of low magnification detection objectives.

8. The system of claim 1, wherein the system (100) improves optical sectioning in high refractive index solutions.

9. The system of claim 1, wherein the system (100) has an increased chamber volume as compared to traditional chambers.

10. The system of claim 1, wherein the system (100) has an increased detection path focal length to increase size of specimens that can be imaged.

11. A specimen imaging system (100) for use in a Zeiss Z.1 Fluorescence Lightsheet Microscope or Lightsheet 7 microscope to adjust a detection objective's focal plane (25) for clear imaging of a tissue (200) in a plurality of different solutions:
   (a) a specimen chamber (1) for accommodating the tissue (200), wherein the tissue (200) is ~2 cm³ in size;
   (b) a first and second side window (2) for a light sheet, wherein the side windows (2) are spaced to center a beam waist of the light sheet generated by an illumination objective (10) at a focal plane of a detection objective (6);
   (c) a chamber positioning mechanism (4) operatively connected to the specimen chamber (1) for facilitating adjustment of a position of the specimen chamber (1), wherein adjusting the position of the specimen chamber (1) adjusts the detection objective focal plane (25);
   (d) a specimen holder (5) for suspending the tissue (200) within the chamber (1); and
   (e) a detection objective collar (7) for repositioning an objective's focal plane to increase imaging range and match a light sheet focal plane, wherein the collar (7) also prevents accidental collision with the specimen chamber (1) during positioning.

12. The system of claim 11, wherein the system (100) improves optical sectioning in high refractive index solutions.

13. The system of claim 11, wherein the system (100) has an increased detection path focal length to increase size of specimens that can be imaged.

14. A method of light sheet fluorescence microscopy for imaging a tissue (200) by adjusting a detection objective focal plane (25) for clear imaging of the tissue (200) in a plurality of different solutions:
   (a) providing a light sheet fluorescence microscope comprising a specimen imaging system (100), the system comprising:
      (i) specimen chamber (1) for accommodating the tissue (200),
      (ii) a first and second side window (2) positioned on either side of the specimen chamber (1), and
      (iii) a chamber positioning mechanism (4) operatively connected to the specimen chamber (1) for facilitating adjustment of an imaging objective focal plane;
   (b) providing the tissue (200);
   (c) disposing the tissue (200) within the specimen holder (5);
   (d) filling the specimen chamber (1) with a solution;
   (e) actuating the chamber positioning screw (4) to adjust a detection objective focal plane (25) according to the refractive index of the solution;
   (f) lowering the specimen holder (5) into the specimen chamber (1);
   (g) actuating the light sheet fluorescence microscope such that a sheet of light generated by an illumination objective (10) is propagated through a first and a second side window (2) and through an entirety of the tissue (200);
   (h) repositioning, by a detection objective collar (7), the specimen chamber (1) to increase imaging range and match the refractive index of the solution.

15. The method of claim 14, wherein the specimen imaging system (100) further comprises a specimen holder (5) removably positioned above the specimen chamber (1) for suspending the tissue (200) within the chamber (1).

16. The method of claim 14, wherein the specimen imaging system (100) further comprises a detection objective collar (7) for repositioning an objective focal plane.

17. The method of claim 14, wherein the light sheet fluorescence microscope is a Zeiss Z.1 Fluorescence Light Sheet Microscope or Lightsheet 7 Fluorescence Light Sheet Microscope.

18. The method of claim 14, wherein the light sheet fluorescence microscope facilitates use of low magnification detection objectives.

19. The method of claim 14, wherein the specimen imaging system (100) improves optical sectioning in high refractive index solutions.

20. The method of claim 14, wherein the specimen imaging system (100) has an increased detection path focal length to increase size of specimens that can be imaged.

* * * * *